US009411193B2

(12) United States Patent
Zhang et al.

(10) Patent No.: US 9,411,193 B2
(45) Date of Patent: Aug. 9, 2016

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhidan Zhang, Beijing (CN); Daekeun Yoon, Beijing (CN); Qing Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 167 days.

(21) Appl. No.: 14/307,937

(22) Filed: Jun. 18, 2014

(65) Prior Publication Data

US 2015/0241720 A1   Aug. 27, 2015

(30) Foreign Application Priority Data

Feb. 21, 2014   (CN) .......................... 2014 1 0058893

(51) Int. Cl.
*G02F 1/1335* (2006.01)
*G02F 1/1333* (2006.01)

(52) U.S. Cl.
CPC .... *G02F 1/133608* (2013.01); *G02F 1/133308* (2013.01)

(58) Field of Classification Search
CPC ............ G02F 1/133308; G02F 1/1335; G02F 1/133504; G02F 1/133608; G02F 1/1333; G02F 1/13; G02F 1/133; G02F 1/133602; G02F 2001/133314; G02F 2001/133317; G02F 2001/13332; G02F 2201/46; G02F 2201/50; G02F 2201/503; G02F 2201/465; G02B 6/0021; F21V 15/01; F21V 17/00; F21V 21/00
USPC .......... 349/65, 58, 61, 62; 348/790, 794, 836; 362/611, 97.1, 613, 612, 97.2, 362, 362/633, 634, 97.3
See application file for complete search history.

(56) References Cited

U.S. PATENT DOCUMENTS 7,310,222 B2 *  12/2007  Bovio ................... G06F 1/1616
                                                         211/169
2002/0149713 A1 *  10/2002  Ishida ............... G02F 1/133608
                                                         349/58

(Continued)

FOREIGN PATENT DOCUMENTS

CN         1466004 A       1/2004
CN       102193219 A       9/2011

(Continued)

OTHER PUBLICATIONS

First Office Action regarding Chinese application No. 201410058893.5, dated Aug. 3, 2015. Translation provided by Dragon Intellectual Property Law Firm.

(Continued)

*Primary Examiner* — Thoi Duong
(74) *Attorney, Agent, or Firm* — Harness, Dickey & Pierce, P.L.C.

(57) ABSTRACT

The present invention relates to a backlight module for providing light to a liquid crystal panel and a display device. The backlight module comprises an optical membrane material arranged at a back surface of the liquid crystal panel, and a module frame surrounding the optical membrane material. An end surface of the module frame facing the liquid crystal panel is located at the back surface of the liquid crystal panel, and the module frame supports the liquid crystal panel through the end surface. The display device comprises a liquid crystal panel and the backlight module. According to the present invention, the end surface of the module frame facing the liquid crystal panel is located at the back surface of the liquid crystal panel. As a result, it is able to provide a very narrow end surface of the module frame, thereby to narrow a bezel of the display device.

15 Claims, 3 Drawing Sheets

(56) References Cited

U.S. PATENT DOCUMENTS

| | | | |
|---|---|---|---|
| 2010/0039580 A1* | 2/2010 | Chen | G02F 1/133608 349/58 |
| 2011/0149194 A1* | 6/2011 | Nakano | G02F 1/133308 349/58 |
| 2011/0310545 A1* | 12/2011 | Liu | G02F 1/133308 361/679.01 |

FOREIGN PATENT DOCUMENTS

| | | |
|---|---|---|
| CN | 102608781 A | 7/2012 |
| CN | 202691809 U | 1/2013 |
| CN | 202929322 U | 5/2013 |
| CN | 103197454 A | 7/2013 |
| JP | 2002221704 A | 8/2002 |
| JP | 2009294377 A | 12/2009 |
| JP | 2011075974 A | 4/2011 |

OTHER PUBLICATIONS

Second Office Action regarding Chinese application No. 201410058893.5, dated Nov. 25, 2015. Translation provided by Dragon Intellectual Property Law Firm.

Third Office Action regarding Chinese application No. 201410058893.5, dated Apr. 1, 2016. Translation provided by Dragon Intellectual Property Law Firm.

* cited by examiner

BACKLIGHT MODULE AND DISPLAY DEVICE

CROSS-REFERENCE TO RELATED APPLICATION

The present application claims a priority of the Chinese patent application No. 201410058893.5 filed on Feb. 21, 2014, which is incorporated herein by reference in its entirety.

FIELD OF THE INVENTION

The embodiment of the present invention relates to an indicating device for displaying variable information by a static method, in particular to a backlight module and a display device.

DESCRIPTION OF THE PRIOR ART

Along with the development of the display technology, a thin, narrow and light display device has been widely used in recent years.

A backlight module is an important component of a liquid crystal display device. Liquid crystals themselves cannot emit light, and the backlight module just functions as to provide a light source with sufficient and evenly-distributed light source, so that the liquid crystal display device can display an image normally. On the basis of different positions of the light source, there are two kinds of backlight modules, i.e., an edge-type backlight module and a direct-type backlight module. As shown in FIG. 1, for an existing display device with the direct-type backlight module, usually a liquid crystal panel 1 is arranged at an inner side of a module frame 2, i.e., an end surface 3 of the module frame 2 facing the liquid crystal panel 1 is located at a front surface of the liquid crystal panel 1. As a result, the display device has a relatively wide bezel, and it is adverse to provide the display device with a narrow bezel.

SUMMARY OF THE INVENTION

An object of the embodiment of the present invention is to provide a backlight module with a narrow bezel, and a display device.

In one aspect, the embodiment of the present invention provides a backlight module for providing light to a liquid crystal panel. The backlight module comprises an optical membrane material arranged at a back surface side of the liquid crystal panel, and a module frame surrounding the optical membrane material. An end surface of the module frame facing the liquid crystal panel is located at the back surface side of the liquid crystal panel, and the module frame supports the liquid crystal panel through the end surface.

The module frame and the liquid crystal panel form a chamber for receiving the optical membrane material in the backlight module of the embodiment of the present invention. A support plate extending toward an interior of the chamber is connected to an inner side of the module frame, and the optical membrane material is arranged on the support plate.

In the backlight module of the embodiment of the present invention, a groove is provided at the inner side of the module frame, and an engagement end engaging with the groove is connected to the optical membrane material and extends into the groove, so as to connect the optical membrane material and the module frame in a clamping manner.

In the backlight module of the embodiment of the present invention, a white shielding body is provided between an outer wall of the optical membrane material and an internal wall of the module frame.

In the backlight module of the embodiment of the present invention, a slot for receiving a chip-on film is provided at a first outer surface of the module frame.

The backlight module further comprises a back plate having a support plate for supporting a light source and a side wall plate perpendicular to the support plate and connected to the support plate so as to support the module frame.

In the backlight module of the embodiment of the present invention, an internal recessed surface corresponding to the end surface is provided at the module frame. The recessed surface faces a direction opposite to a direction that the end surface faces, and the side wall plate is in contact with the recessed surface so as to support the module fame therethrough.

In the backlight module of the embodiment of the present invention, a clamping slot is provided at the module frame, and a bottom wall of the clamping slot corresponds to the end surface. The side wall plate extends into the clamping slot and is in contact with the bottom wall of the clamping slot, so as to support the module frame therethrough.

In the backlight module of the embodiment of the present invention, an internal bearing surface of the support plate for supporting the light source is provided with a containing slot, in which foam is provided.

In the backlight module of the embodiment of the present invention, an end of the support plate extending toward the interior of the chamber is connected to an oblique plate that extends downward and is tilted toward the interior of the chamber. The oblique plate and the module frame form a triangular structure.

In the backlight module of the embodiment of the present invention, the light source is also received in the chamber.

In another aspect, the present invention provides a display device comprising a liquid crystal panel and the above-mentioned backlight module.

In the display device of the embodiment of the present invention, a stop block is arranged on the end surface of the module frame and includes a first block and a second block that are in contact with the end surface. The liquid crystal panel extends into between the first and second blocks, through which the stop block limits a position of the liquid crystal panel.

The display device further comprises an outer frame including an outer frame portion arranged at a front surface side of the liquid crystal panel and a side frame portion connected to the outer frame portion. The outer frame portion is in contact with the second block, and the side frame portion surrounds the module frame from the side.

In the display device of the embodiment of the present invention, a through-hole is provided in the side frame portion, and the stop block includes a connection body connecting the first and second blocks. The connection body extends into the through-hole, so as to fix the stop block and the side frame portion together.

In the display device of the embodiment of the present invention, a second outer surface of the side frame portion is provided with a black shielding body for covering the through-hole.

According to the backlight module and the display device of the embodiment of the present invention, the end surface of the module frame facing the liquid crystal panel is located at the back surface side of the liquid crystal panel. As a result, it is able to provide a very narrow end surface of the module frame, thereby to narrow a bezel of the display device.

DETAILED DESCRIPTION OF THE PREFERRED EMBODIMENTS

In order to enable a person skilled in the art to understand and carry out the present invention in a better manner, the present invention will be described hereinafter in conjunction with the drawings and the embodiments, but the following embodiments shall not be used to limit the present invention.

First Embodiment

Figure 1:
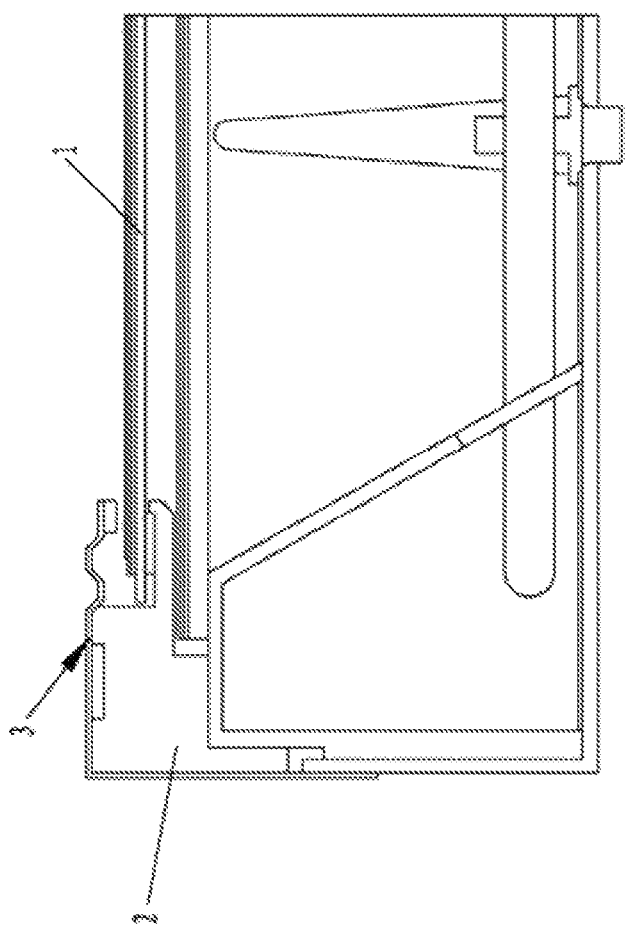
FIG. 1 is a schematic view showing an existing display device.
Figure 2:
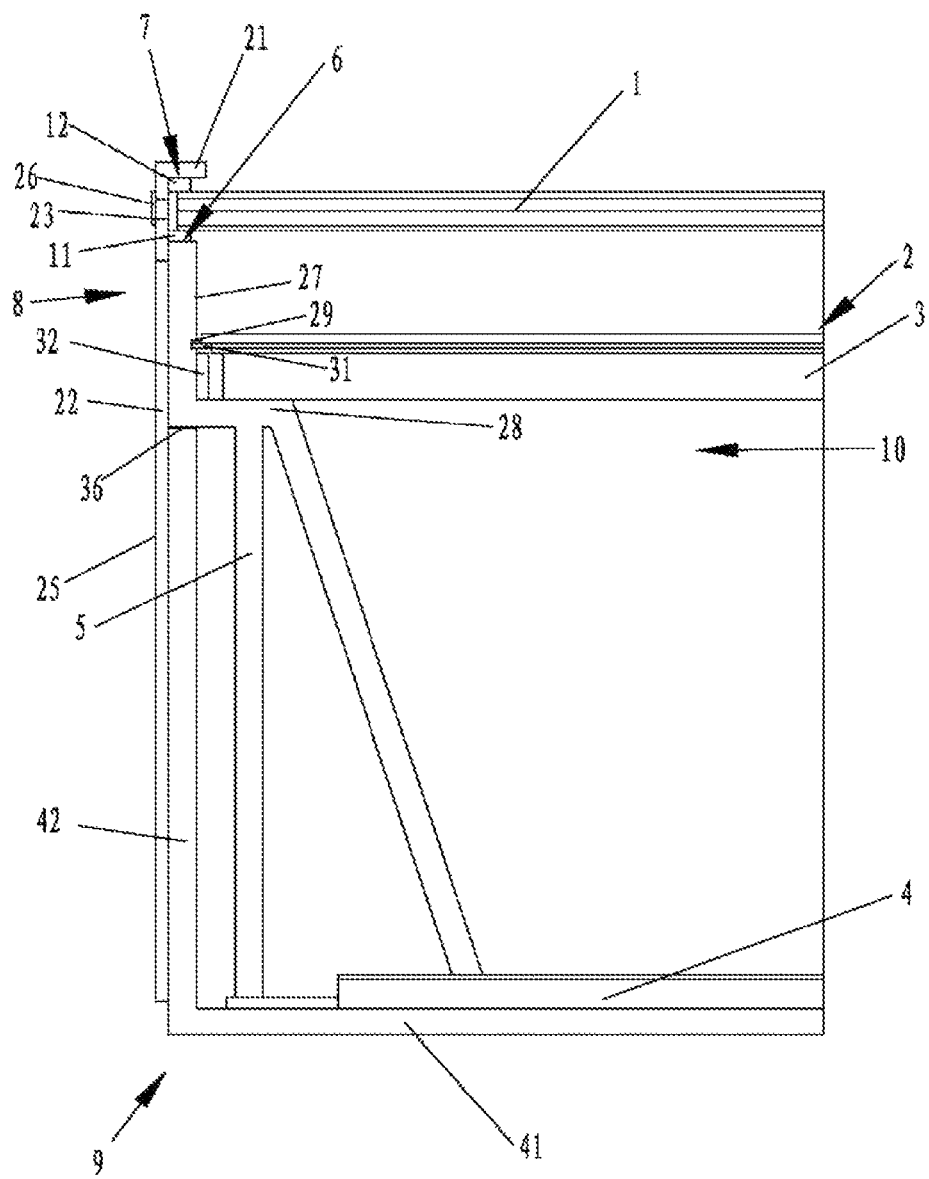
FIG. 2 is a schematic view showing a display device according to one embodiment of the present invention.

Referring to FIG. 2, a display device of the embodiment of the present invention comprises a liquid crystal panel 1 and a backlight module 2 for providing light to the liquid crystal panel 1. The backlight module 2 in this embodiment is one example of the backlight module of the present invention.

The backlight module 2 comprises an optical membrane material 3 arranged at a back surface side of the liquid crystal panel 1, and a module frame 5 surrounding the optical membrane material 3 and including an end surface 6 facing the back surface of the liquid crystal panel 1. The end surface 6 is located at the back surface side of the liquid crystal panel 1, i.e., the end surface 6 of the module frame 5 facing the liquid crystal panel 1 is located at the back surface side of the liquid crystal panel 1, and the module frame 5 supports the liquid crystal panel 1 through the end surface 6.

Different from an existing display device with a direct-type backlight module, in which the liquid crystal panel is arranged at an inner side of a module frame, in this embodiment, the end surface 6 of the module frame 5 facing the liquid crystal panel 1 is located at the back surface side of the liquid crystal panel 1, and when the liquid crystal panel 1 is arranged with its front surface up, it is just arranged on the module frame 5. In other words, the module frame 5 supports the liquid crystal panel 1 through the end surface 6, so as to provide a very narrow end surface 6 of the module frame 5, thereby to narrow the bezel of the display device.

In the backlight module 2, the module frame 5 and the liquid crystal panel 1 form a chamber 10 for receiving the optical membrane material 3 and a light source 4. A support plate 28 extending toward an interior of the chamber 10 is connected to an inner side 27 of the module frame 5, and the optical membrane material 3 is arranged on the support plate 28.

An end of the support plate 28 extending toward the interior of the chamber 10 is connected to an oblique plate that extends downward and is tilted toward the interior of the chamber 10. The oblique plate and the module frame 5 form a triangular structure. Such a triangular structure will help to immobilize the support plate 28, thereby to further immobilize the optical membrane material 3.

A groove 29 is provided at the inner side 27 of the module frame 5, and an engagement end 31 engaging with the groove 29 is connected to the optical membrane material 3 and extends into the groove 29, so as to connect the optical membrane material 3 and the module frame 5 in a clamping manner.

A white shielding body 32 is provided between an outer wall of the optical membrane material 3 and an internal wall of the module frame 5, so as to prevent the light leakage and prevent a foreign matter from entering into the inside of the chamber 10.

The backlight module 2 further comprises a back plate 9 having a support plate 41 for supporting the light source 4 and a side wall plate 42 perpendicular to the support plate 41 and connected to the support plate 41 so as to support the module frame 5.

An internal recessed surface 36 corresponding to the end surface 6 is provided at the module frame 5. The recessed surface 36 faces a direction opposite to a direction that the end surface 6 faces, and the side wall plate 42 is in contact with the recessed surface 36 so as to support the module fame 5 therethrough.

A stop block 7 is arranged on the end surface 6 of the module frame 5 and includes a first block 11 and a second block 12 that are in contact with the end surface 6. The liquid crystal panel 1 extends into between the first block 11 and the second block 12, through which the stop block 7 limits a position of the liquid crystal panel 1.

Due to the stop block 7, it is able to improve the strength of the liquid crystal panel 1 at four corners, thereby to further ensure a firm display device as a whole and narrow the bezel thereof.

The display device further comprises an outer frame 8 including an outer frame portion 21 arranged at a front surface side of the liquid crystal panel 1 and a side frame portion 22 connected to the outer frame portion 21. The outer frame portion 21 is in contact with the second block 12, and the side frame portion 22 surrounds the module frame 5 from the side.

A through-hole 23 is provided in the side frame portion 22, and the stop block 7 includes a connection body connecting the first block 11 and the second block 12. The connection body extends into the through-hole 23, so as to fix the stop block 7 and the side frame portion 22 together. Due to the engagement of the stop block 7 with the side frame portion 22, it is able to further improve the strength of the liquid crystal panel 1 at the four corners, and narrow the bezel of the display device.

A second outer surface 25 of the side frame portion 22 is provided with a black shielding body 26 for covering the through-hole 23, so as to prevent the light leakage and prevent the foreign matter from entering the inside of the display device.

Second Embodiment

Figure 3:
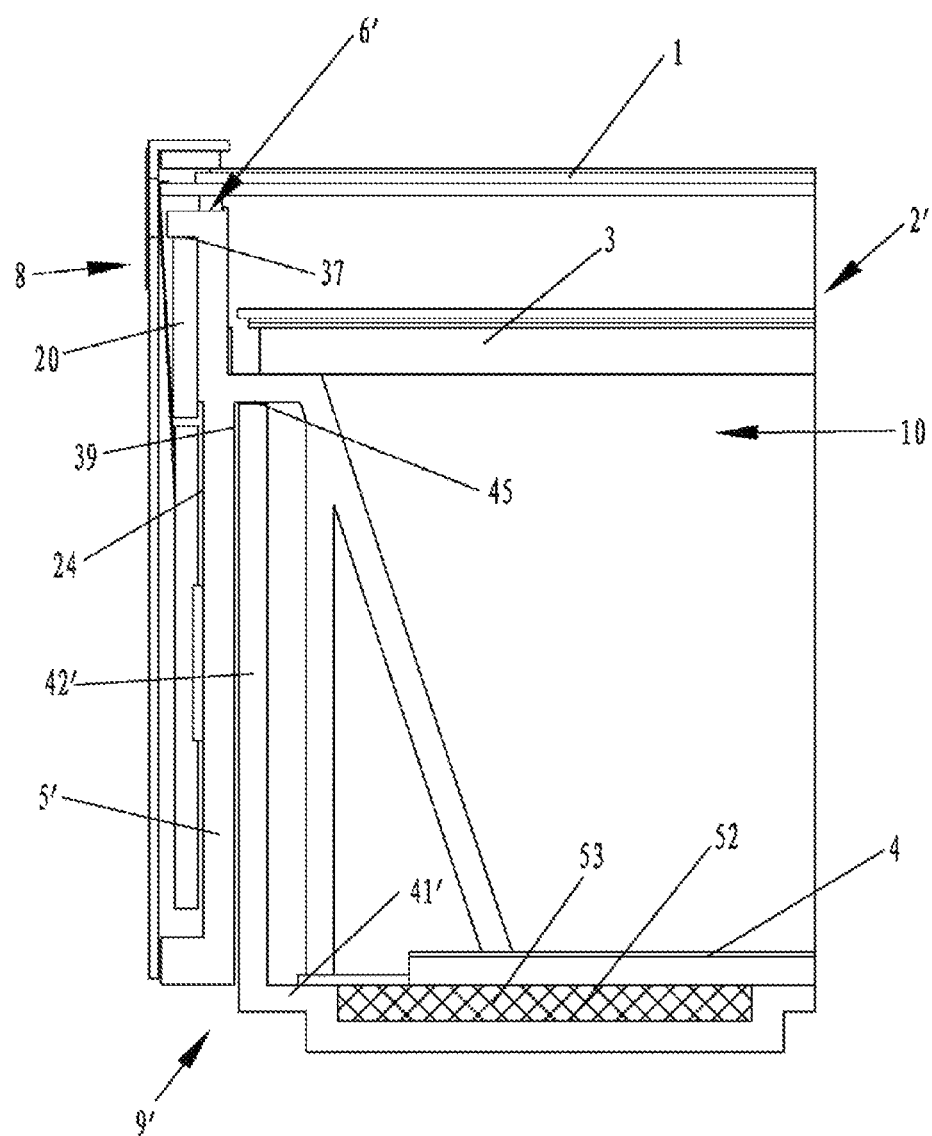
FIG. 3 is a schematic view showing the display device according to another embodiment of the present invention.

Referring to FIG. 3, the display device of this embodiment merely differs from that of the first embodiment merely in the backlight module, and the backlight module is used for providing light to the liquid crystal panel 1. The backlight module 2' of this embodiment is another example of the backlight module of the present invention.

The backlight module 2' differs from the backlight module 2 of the first embodiment in that a slot 37 for receiving a chip-on film 20 is provided at a first outer surface 24 of the module frame 5' of the backlight module 2', so as to further improve the mounting strength of the liquid crystal panel and narrow the bezel of the display device.

The backlight module 2' differs from the backlight module 2 of the first embodiment also in that a clamping slot 39 is provided at the module frame 5'. A bottom wall 45 of the clamping slot 39 corresponds to the end surface 6'. The side wall plate 42' extends into the clamping slot 39 and is in contact with the bottom wall 45 of the clamping slot 39, so as to support the module frame 5' therethrough.

An internal bearing surface of the support plate 41' for supporting the light source 4 is provided with a containing slot 52, in which foam 53 is provided so as to protect the light source 4.

The foam 53 is used to buffer and protect a circuit board of the light source 4, and the containing slot 52 may serve as a reinforcing rib, so as to improve the strength of the back plate 9'.

In the display device, the backlight module 2' of this embodiment and the backlight module 2 of the first embodiment may be replaceable with each other.

The above are merely the optional embodiments of the present invention. It should be appreciated that, a person skilled in the art may make further improvements and modifications without departing from the principle of the present invention, and these improvements and modifications shall also be considered as the scope of the present invention.

What is claimed is:

1. A backlight module for providing light to a liquid crystal panel, comprising an optical membrane material arranged at a back surface side of the liquid crystal panel, and a module frame surrounding the optical membrane material, wherein
   an end surface of the module frame facing the liquid crystal panel is located at the back surface side of the liquid crystal panel, and
   the module frame supports the liquid crystal panel through the end surface;
   the module frame and the liquid crystal panel form a chamber for receiving the optical membrane material, a support plate extending toward an interior of the chamber is connected to an inner side of the module frame, and the optical membrane material is arranged on the support plate;
   a groove is provided at the inner side of the module frame, and an engagement end engaging with the groove is connected to the optical membrane material and extends into the groove, so as to connect the optical membrane material and the module frame in a clamping manner;
   wherein there exists an interval between a projection of the groove onto the liquid crystal panel and a projection of the optical membrane material onto the liquid crystal panel.

2. The backlight module according to claim 1, wherein a white shielding body is provided between an outer wall of the optical membrane material and an internal wall of the module frame.

3. The backlight module according to claim 1, wherein an end of the support plate extending toward the interior of the chamber is connected to an oblique plate that extends downward and is tilted toward the interior of the chamber, and
   the oblique plate and the module frame form a triangular structure.

4. The backlight module according to claim 1, wherein the light source is also received in the chamber.

5. The backlight module according to claim 1, wherein a slot for receiving a chip-on film is provided at a first outer surface of the module frame.

6. The backlight module according to claim 1, further comprising:
   a back plate having a support plate for supporting a light source and a side wall plate perpendicular to the support plate and connected to the support plate so as to support the module frame.

7. The backlight module according to claim 6, wherein an internal recessed surface corresponding to the end surface is provided at the module frame,
   the internal recessed surface faces a direction opposite to a direction that the end surface faces, and
   the side wall plate is in contact with the internal recessed surface so as to support the module fame therethrough.

8. The backlight module according to claim 6, wherein a clamping slot is provided at the module frame,
   a bottom wall of the clamping slot corresponds to the end surface, and
   the side wall plate extends into the clamping slot and is in contact with the bottom wall of the clamping slot, so as to support the module frame through the bottom wall of the clamping slot.

9. The backlight module according to claim 6, wherein an internal bearing surface of the support plate for supporting the light source is provided with a containing slot, foam is provided in the containing slot.

10. A display device comprising a liquid crystal panel and the backlight module according to claim 1.

11. The display device according to claim 10, wherein a stop block is arranged on the end surface of the module frame and includes a first block and a second block that are in contact with the end surface, and
    the liquid crystal panel extends into between the first and second blocks, the stop block limits a position of the liquid crystal panel through the first and second blocks.

12. The display device according to claim 11, further comprising an outer frame including an outer frame portion arranged at a front surface side of the liquid crystal panel and a side frame portion connected to the outer frame portion, wherein
    the outer frame portion is in contact with the second block, and
    the side frame portion surrounds the module frame from the side.

13. The display device according to claim 12, wherein a through-hole is provided in the side frame portion,
    the stop block includes a connection body connecting the first and second blocks, and
    the connection body extends into the through-hole, so as to fix the stop block and the side frame portion together.

14. The display device according to claim 13, wherein a second outer surface of the side frame portion is provided with a black shielding body for covering the through-hole.

15. The display device according to claim 10, further comprising a back plate having a support plate for supporting a light source and a side wall plate perpendicular to the support plate and connected to the support plate so as to support the module frame.

* * * * *